United States Patent
Vukojevic et al.

(10) Patent No.: US 8,680,812 B2
(45) Date of Patent: Mar. 25, 2014

(54) METHODS AND SYSTEMS FOR CHARGING AN ELECTRIC VEHICLE

(75) Inventors: Aleksandar Vukojevic, Kennesaw, GA (US); John Christopher Boot, Sandy Springs, GA (US)

(73) Assignee: General Electric Company, Schenectady, NY (US)

( * ) Notice: Subject to any disclaimer, the term of this patent is extended or adjusted under 35 U.S.C. 154(b) by 463 days.

(21) Appl. No.: 13/044,070

(22) Filed: Mar. 9, 2011

(65) Prior Publication Data
US 2012/0229082 A1 Sep. 13, 2012

(51) Int. Cl.
*H02J 7/00* (2006.01)

(52) U.S. Cl.
USPC .......................................... 320/108; 320/109

(58) Field of Classification Search
USPC ........................................................ 320/108
See application file for complete search history.

(56) References Cited

U.S. PATENT DOCUMENTS

| | | | | |
|---|---|---|---|---|
| 5,926,004 A * | 7/1999 | Henze | | 320/109 |
| 2008/0106425 A1* | 5/2008 | Deaver et al. | | 340/646 |
| 2009/0091291 A1 | 4/2009 | Woody et al. | | |
| 2009/0313033 A1 | 12/2009 | Hafner et al. | | |
| 2009/0313034 A1 | 12/2009 | Ferro et al. | | |
| 2009/0313103 A1 | 12/2009 | Ambrosio et al. | | |
| 2009/0313104 A1 | 12/2009 | Hafner et al. | | |
| 2010/0228404 A1* | 9/2010 | Link et al. | | 701/1 |
| 2010/0280675 A1 | 11/2010 | Tate, Jr. et al. | | |

FOREIGN PATENT DOCUMENTS

CN 101436689 A 5/2009

OTHER PUBLICATIONS

A Chinese-language Office Action, dated Dec. 4, 2013, for co-pending CN patent application No. 201210070695.1 (6 pgs).

* cited by examiner

*Primary Examiner* — Arun Williams
(74) *Attorney, Agent, or Firm* — General Electric Company (57) ABSTRACT

An electric vehicle charging system is described. The electric vehicle charging system includes a plurality of electric vehicle charging apparatus coupled to, and configured to receive electric power from, a distribution transformer. The electric vehicle charging system also includes a central processing device configured to control operation of the plurality of electric vehicle charging apparatus.

12 Claims, 4 Drawing Sheets

METHODS AND SYSTEMS FOR CHARGING AN ELECTRIC VEHICLE

BACKGROUND OF THE INVENTION

The embodiments described herein relate generally to electric vehicles and, more specifically, to methods and systems for charging an electric vehicle.

In response to increasing fuel costs related to the use of conventional combustion engine vehicles and in response to heightened environmental concerns, including air pollution, the use of electric vehicles has increased. As a result, energy demand will likely increase in the form of electrical energy used to charge batteries or other energy storage devices used in such vehicles. Typically, an electric vehicle owner has two options for vehicle charging. The electric vehicle may be coupled to a standard residential electrical outlet, which provides, in the example of the United States of America, 120 volts of alternating current (VAC) at approximately 15-20 amperes. A residence may also include a higher power connection to the power grid, for example, in the form of an electric vehicle charging station. The electric vehicle charging station may provide, for example, 240 VAC at approximately 30-32 amperes. The higher power provided by the vehicle charging station facilitates a quicker charging cycle for the electric vehicle than provided by the standard electrical outlet.

The higher power drawn by the electric vehicle through the charging station also increases the strain on power grid components, for example, distribution transformers. A distribution transformer reduces a primary voltage of the electric distribution system to the utilization voltage serving the consumer. Typically, a distribution transformer serves approximately seven to ten residences. The distribution transformer may experience greater loss-of-life (i.e., the useful life of the power grid component may be reduced) due to the increased demand caused by electric vehicle charging. The expected use of electric vehicles will add to the increased strain on power grid components. For example, individual employment schedules vary, however, as indicated by typical use of roadways and traffic flow, a majority of motorists return to a residence from a place of business in the early evening. It is expected that a majority of electric vehicle owners will desire to charge their electric vehicle upon returning to their residence from their place of business. An electric vehicle charged at 240 VAC and approximately 30-32 amperes is likely to create a larger individual residential electrical load than any other residential electrical load. Furthermore, if multiple residences served by a single distribution transformer include a vehicle charging station, the power demand created by charging of electric vehicles may cause the distribution transformer to overload, which in turn, reduces the lifecycle of the distribution transformer.

BRIEF DESCRIPTION OF THE INVENTION

In one aspect, an electric vehicle charging system is provided. The electric vehicle charging system includes a plurality of electric vehicle charging apparatus coupled to, and configured to receive electric power from, a distribution transformer. The electric vehicle charging system also includes a central processing device configured to control operation of the plurality of electric vehicle charging apparatus.

In another aspect, a method for controlling charging of an electric vehicle using an electric vehicle charging apparatus coupled to a distribution transformer is provided. The method includes determining an electrical load on the distribution transformer and providing the electric vehicle charging apparatus with an electric power charging signal if providing power to the electric vehicle charging apparatus will not cause the electrical load on the distribution transformer to exceed a predefined nominal load rating of the distribution transformer.

DETAILED DESCRIPTION OF THE INVENTION

The methods and systems described herein are described as applied to exemplary embodiments, namely, methods and systems for controlling an electric vehicle charging system. However, it is contemplated that this disclosure has general application to power distribution in industrial, commercial, and residential applications.

The methods and systems described herein facilitate controlling the charging of electric vehicles. A power distribution grid includes a distribution transformer that reduces a primary voltage of the electric distribution grid to the utilization voltage serving the consumer. Typically, a distribution transformer serves approximately seven to ten residences. An electric vehicle charging system is coupled to the distribution transformer and controls the charging of a plurality of electric vehicles, and in what order the plurality of electric vehicles are provided power for charging. Controlling the charging of the electric vehicles facilitates maintaining the load on the distribution transformer below a nominal load rating that when exceeded, reduces the lifecycle of the distribution transformer. Furthermore, controlling the charging of electric vehicles provides a consumer with charging options that include both a monetary electric rate charged by the utility company and the time at which the vehicle is charged. The charging options may include providing power to an electric vehicle, even though the load on the distribution transformer will exceed the nominal load rating of the distribution transformer, in exchange for a premium monetary electric rate paid by the consumer.

Technical effects of the methods and systems described herein include at least one of: (a) determining an electrical load on a distribution transformer; and (b) providing the electric vehicle charging apparatus with an electric power charging signal if providing power to the electric vehicle charging apparatus will not cause the load on the distribution transformer to exceed a predefined nominal load rating of the distribution transformer.

Figure 1:
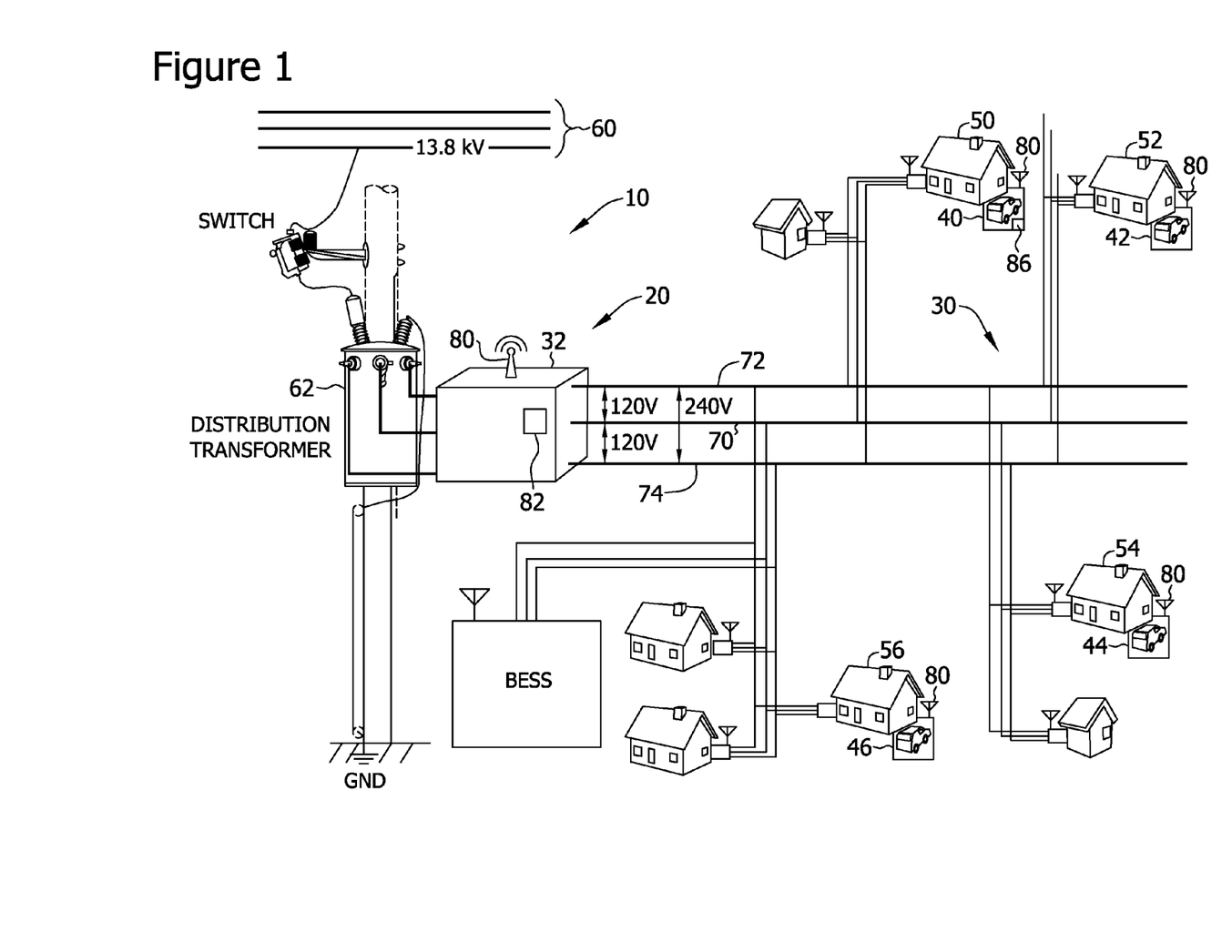
FIG. 1 is a diagram of a power distribution system that includes an electric vehicle charging system.

FIG. 1 is a diagram of an electric power distribution system 10 that includes an electric vehicle charging system 20. In the exemplary embodiment, electric vehicle charging system 20 includes a plurality of electric vehicle charging apparatus 30 and a central processing device 32. In the exemplary embodiment, the plurality of electric vehicle charging apparatus 30 includes a first electric vehicle charging apparatus 40, a second electric vehicle charging apparatus 42, a third electric vehicle charging apparatus 44, and a fourth electric vehicle charging apparatus 46. Although described herein as including four electric vehicle charging apparatus, electric vehicle charging system 20 may include any number of electric vehicle charging apparatus that allows system 20 to function as described herein. Furthermore, although referred to herein as electric vehicle charging apparatus, apparatus 40, 42, 44, and 46 may also be referred to as electric vehicle charging stations (EVCS).

In the exemplary embodiment, first EVCS 40 is positioned at a first location 50, second EVCS 42 is positioned at a second location 52, third EVCS 44 is positioned at a third location 54, and fourth EVCS 46 is positioned at a fourth location 56. Although illustrated in FIG. 1 as separate residences, locations 50, 52, 54, and 56 may be any location including, but not limited to, residential structures including houses and/or garages, commercial structures including parking lots, garages, and/or parking structures, municipal locations including parking lots, garages, parking structures, and/or street parking spots, or any other type of location where electric vehicle charging could be performed.

In the exemplary embodiment, distribution lines 60 provide electricity to a distribution transformer 62. Distribution transformer 62 steps down voltage provided by distribution lines 60 to a voltage level used by a consumer. Although illustrated as a pole-mounted transformer, distribution transformer 62 may be a ground-mounted transformer, integrated within a substation, or any other type of distribution transformer that allows system 20 to function as described herein. In the exemplary embodiment, distribution transformer 62 is a single-phase transformer, although, in other embodiments, distribution transformer 62 may also include three-phases. Typically, distribution transformer 62 ranges in capacity from 5 kilovolt-ampere (kVA) to 150 kVA. More specifically, distribution transformer 62 may have a capacity of 15 kVA to 25 kVA, which is a power level capable of supplying power to approximately seven to ten residential locations. For example, in a 240/120 volt (V) split-phase system, distribution transformer 62 may include a 240 V secondary winding (not shown in FIG. 1) that is center-tapped such that a first conductor 70 is neutral (i.e., grounded), a second conductor 72 and a third conductor 74 are "hot" with respect to first conductor 70. A connection between first conductor 70 and second conductor 72 provides 120 V, a connection between first conductor 70 and third conductor 74 provides 120 V, and a connection between second conductor 72 and third conductor 74 provides 240 V. Although described herein as a 240/120 volt split-phase system, system 20 may be included within a 416Y/240 system or any other power distribution system that allows system 20 to function as described herein.

In the exemplary embodiment, an electric vehicle may be charged at two power levels. A first power level is provided by a typical electrical outlet and corresponds to approximately a twelve ampere load at 120 V (i.e., a load coupled to first conductor 70 and second conductor 72, or a load coupled to first conductor 70 and third conductor 74). A second power level is provided by, for example, EVCS 40 and corresponds to approximately a thirty-two ampere load at 240 V (i.e., a load coupled to second conductor 72 and third conductor 74). Charging an electric vehicle at the second power level facilitates significantly quicker charging of the electric vehicle than charging at the first power level. However, when charging an electric vehicle at the second power level, the electric vehicle may be the largest individual residential load drawing power from distribution transformer 62. For example, charging a single electric vehicle at the second power level represents approximately 7.2 kilowatt (kW) of load. Therefore, multiple EVCS coupled to distribution transformer 62 may cause distribution transformer 62 to exceed a predefined nominal load rating ($kVA_{NOM}$) and/or a predefined maximum load rating ($kVA_{UL}$). Exceeding these predefined load ratings may cause a reduction in the lifecycle of distribution transformer 62 (i.e., distribution transformer 62 will need to be replaced after a shorter period of use).

In the exemplary embodiment, central processing device 32 and each of the plurality of EVCS 30 include a communications device 80 configured to facilitate communication between central processing device 32 and each of the plurality of EVCS 30. For example, communications device 80 transmits an identification signal from EVCS 40 to central processing device 32. The identification signal uniquely identifies EVCS 40 to central processing device 32. Central processing device 32 determines a number of EVCS coupled to distribution transformer 62 based on received identification signals. Communications device 80 may include a radio frequency identification device (RFID) and/or any other device facilitating communication between EVCS 40, 42, 44, and 46 and central processing device 32. The plurality of EVCS 30 and central processing device 32 may be included within a network that includes wired and/or wireless components. Wireless components may be configured to use wireless standards including, but not limited to, 2G, 3G, and 4G cellular standards such as LTE, EDGE, and GPRS, IEEE 802.16 Wi-Max, IEEE 802.15 ZigBee®, Bluetooth, IEEE 802.11 standards including 802.11a, 802.11b, 802.11d, 802.11e, 802.11g, 802.11h, 802.11i, 802.11j, and 802.11n, Wi-Fi®, and proprietary standards such as Z-Wave®. Wi-Fi® is a certification mark developed by the Wi-Fi Alliance, Inc. of Austin, Tex., ZigBee® is a registered trademark of ZigBee Alliance, Inc. of San Ramon, Calif., and Z-Wave® is a registered trademark of Sigma Designs, Inc. of Milpitas, Calif.

In the exemplary embodiment, system 20 also includes at least one sensor 82 configured to collect data and provide the data to central processing device 32. Central processing device 32 determines an electrical load presently drawn from distribution transformer 62 based on the received data. For example, the at least one sensor 82 performs measurements that provide values from which the electrical load on distribution transformer 62 can be calculated. In the exemplary embodiment, sensor 82 generates a load signal that includes data corresponding to the present electrical load on distribution transformer 62. Sensor 82 may be included within central processing device 32 or may be separate from, and coupled to, central processing device 32.

In the exemplary embodiment, central processing device 32 controls operation of plurality of EVCS 30. For example, central processing device 32 receives the load signal from sensor 82, receives a charging request from first EVCS 40, and provides first EVCS 40 with an electric power charging signal if it is determined that providing power to first EVCS 40 will not cause the present load on distribution transformer 62 to exceed the predefined nominal load rating of distribution transformer 62. For example, when a consumer couples an electric vehicle to first EVCS 40, first EVCS 40 generates and transmits a charging request to central processing device 32. Upon receipt of the charging request, central processing device 32 determines if providing power to first EVCS 40 will cause the present load on distribution transformer 62 to exceed the predefined nominal load rating. For example, central processing device 32 may compare the present electrical load to a power available under the predefined nominal power rating for distribution transformer 62 to determine if providing power to first EVCS 40 will cause the present load on distribution transformer 62 to exceed the predefined nominal load rating of distribution transformer 62.

In the exemplary embodiment, central processing device 32 may also compare the present electrical load to a predefined maximum distribution transformer load rating if it is determined that providing power to first EVCS 40 will cause the present load on distribution transformer 62 to exceed the predefined nominal load rating. The predefined maximum distribution transformer load rating is defined by a utility company as the maximum load the utility company will allow to be placed on distribution transformer 62. In a typical example, the predefined maximum load rating is approximately 10% higher than the predefined nominal load rating. Furthermore, central processing device 32 may deny service to first EVCS 40 and place first EVCS 40 in a charging queue if it is determined that charging an electric vehicle at first EVCS 40 would cause the present electrical load on distribution transformer 62 to exceed the predefined maximum distribution transformer load rating.

In the exemplary embodiment, first EVCS 40 includes an input/output device 86 configured to display at least one charging option to a consumer and to receive at least one selection from the consumer. For example, input/output device 86 may include a touch screen that displays charging options to a consumer and receives a selection from the consumer. Alternatively, input/output device 86 may include a display screen and an input device, or any other combination of input and output devices, that allow system 20 to function as described herein. More specifically, central processing device 32 may transmit a charging option selection signal to first EVCS 40 if it is determined that providing power to first EVCS 40 will not cause the present load on distribution transformer 62 to exceed the predefined maximum distribution transformer load rating. Upon receipt of the charging option selection signal, input/output device 86 displays the charging options to the consumer.

Once the consumer selects from the charging options, central processing device 32 receives, from input/output device 86, at least one of a charge-delay signal and a charge-now signal. In this example, the charging options include choosing between waiting to begin charging the electric vehicle at a first monetary rate, referred to herein as a charge-delay selection, or charging the electric vehicle now at a second, higher monetary rate, referred to herein as a charge-now selection. The first monetary rate may be a time-of-use rate, substantially similar to the rate the consumer typically pays for electricity at the time the charge is requested. The second monetary rate may be higher than the typical time-of-use rate, wherein the utility company is essentially offering the consumer the option of charging their vehicle without waiting in exchange for paying a higher rate for the electricity used to charge the vehicle. The second monetary rate may be determined to offset increased costs and/or value lost by the utility due to the reduction in the lifecycle of distribution transformer 62 caused by applying a load to distribution transformer 62 that exceeds the nominal load rating of distribution transformer 62.

In at least some embodiments, central processing device 32 is further configured to determine the second monetary rate (i.e., the energy rate associated with the charge-now selection) and to include data corresponding to at least one of the first monetary rate and the second monetary rate within the charging option selection signal provided to input/output device 86. For example, the second monetary rate may be determined based at least partially on a signal received from the utility that includes rate information. The second monetary rate may also be determined based at least partially on tables stored and accessible by central processing device 32, and/or determined in any other manner that allows system 20 to function as described herein. The monetary rate(s) are then displayed by input/output device 86, and the consumer is able to make their decision on when to charge their electric vehicle with the added knowledge of the rates associated with one, or both, charging options.

Figure 2:
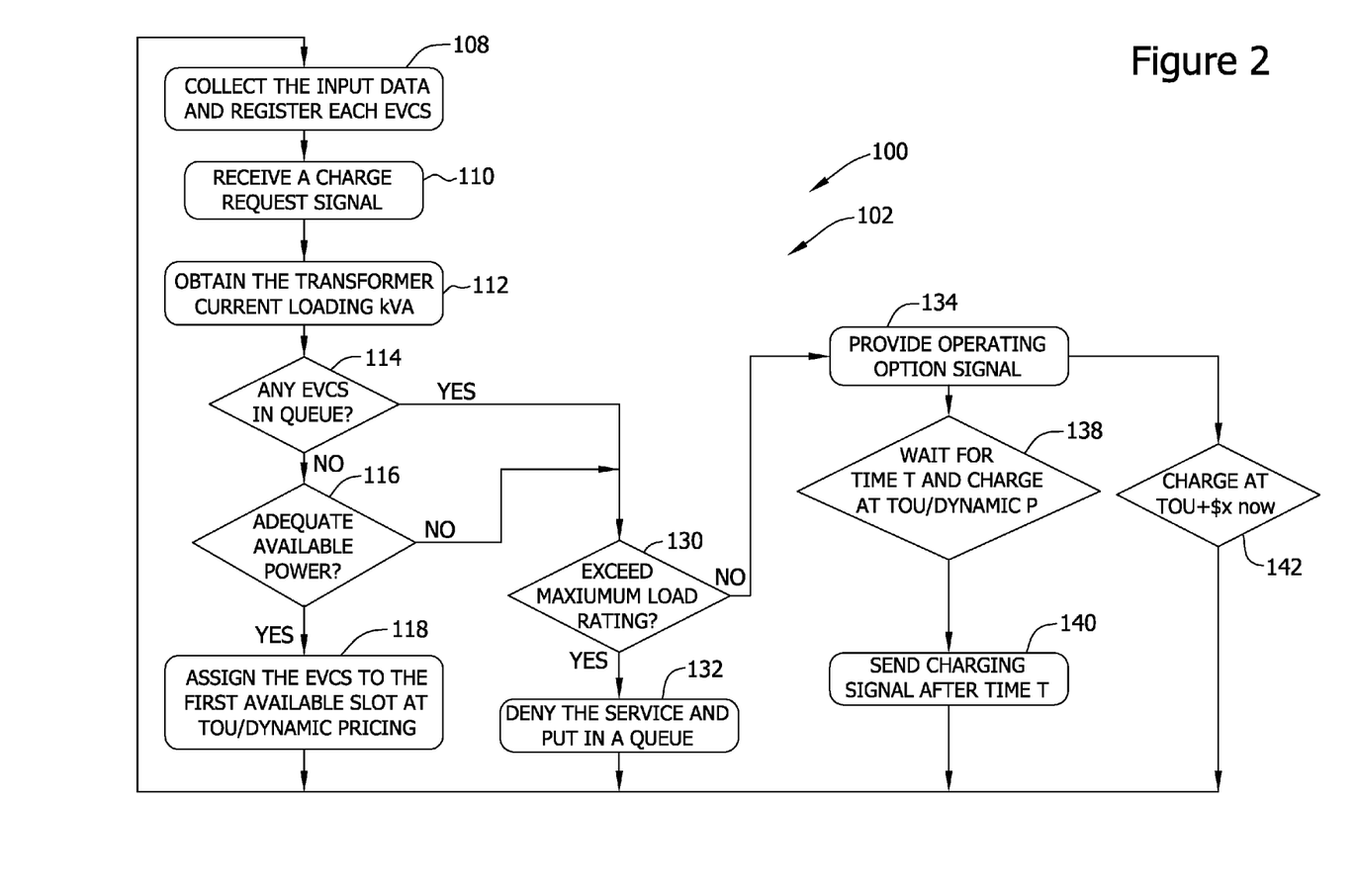
FIG. 2 is a flow chart of an exemplary method for controlling the electric vehicle charging system shown in FIG. 1.

FIG. 2 is a flow chart 100 of an exemplary method 102 for controlling an electric vehicle charging system, for example, electric vehicle charging system 20 shown in FIG. 1. In the exemplary embodiment, method 102 includes registering 108 the EVCSs that are coupled to a distribution transformer, for example, plurality of EVCS 30 (shown in FIG. 1) that are coupled to distribution transformer 62 (shown in FIG. 1). For example, central processing device 32 receives identification signals from each of the plurality of EVCS 30 and registers 108 each EVCS coupled to distribution transformer 62. In the exemplary embodiment, method 102 also includes receiving 110 a charge request signal. For example, central processing device 32 may receive 110 a charge request signal from first EVCS 40. Method 102 also includes measuring 112 a present electrical load ($kVA_M$) on distribution transformer 62. Measuring 112 may include receiving, at central processing device 32, a measurement from a sensor, for example, sensor 82 (shown in FIG. 1). Method 102 may also include determining 114 if there are any EVCS waiting to receive an electric power charging signal (i.e., are any EVCS presently in a charging queue).

If central processing device 32 determines 114 that there are no EVCS presently in the charging queue, method 102 includes determining 116 if providing power to an EVCS will cause distribution transformer 62 to exceed a predefined nominal load rating ($kVA_{NOM}$). For example, upon receiving 110 a charge request signal from first EVCS 40, central processing device 32 determines 116 if providing power to first EVCS 40 will cause the present load on distribution transformer 62 to exceed the predefined nominal load rating.

For example, to determine 116 if providing power to first EVCS 40 will cause the present load on distribution transformer 62 to exceed the predefined nominal load rating of distribution transformer 62, central processing device 32 determines an available power ($kVA_A$). The available power is a power that if exceeded, will cause distribution transformer 62 to reach the predefined nominal load rating of distribution transformer 62. The available power may be calculated by subtracting the present electrical load ($kVA_M$) from the predefined nominal load rating ($kVA_{NOM}$) of distribution transformer 62.

In the exemplary embodiment, determining 116 includes comparing the available power ($kVA_A$) to a typical power drawn by EVCS 40. If central processing device 32 determines 116 that the available power ($kVA_A$) is greater than the typical power drawn by EVCS 40, then a determination is made that providing power to EVCS 40 will not cause distribution transformer 62 to exceed the predefined nominal load rating ($kVA_{NOM}$). If central processing device 32 determines 116 that the available power ($kVA_A$) is less than the typical power drawn by EVCS 40, then a determination is made that providing power to EVCS 40 will cause distribution transformer 62 to exceed the predefined nominal load rating ($kVA_{NOM}$). Central processing device 32 may be programmed to determine 116 that providing power to EVCS 40 will, or will not, cause the present electrical load ($kVA_M$) on distribution transformer 62 to exceed the predefined nominal load rating ($kVA_{NOM}$) when the available power ($kVA_A$) is equal to the typical power drawn by EVCS 40. In a specific example, EVCS 40 may draw 7.2 kW of power for use in charging a vehicle. If $kVA_M$ is less than $kVA_{NOM}$—7.2 kW, then a determination is made that providing power to EVCS 40 will not cause the present load on distribution transformer 62 to exceed the predefined nominal load rating.

If central processing device 32 determines 116 that providing power to first EVCS 40 will not cause the load on distribution transformer 62 to exceed the predefined nominal load rating ($kVA_{NOM}$) (i.e., available power ($kVA_A$) is greater than or equal to the typical power drawn by EVCS 40), method 102 includes assigning 118 first EVCS 40 to a first available charging slot and charging the consumer for the electricity at a first energy rate (e.g., a time-of-use energy rate typically charged to the consumer for electricity). Assigning 118 first EVCS 40 to a first available charging slot includes providing first EVCS 40 with an electric power charging signal.

If central processing device 32 determines 116 that providing power to first EVCS 40 will cause distribution transformer 62 to exceed the predefined nominal load rating ($kVA_{NOM}$), method 102 also includes determining 130 if providing power to first EVCS 40 will cause the load on distribution transformer 62 to exceed a predefined maximum distribution transformer load rating ($kVA_{UL}$). As described above, the predefined maximum distribution transformer load rating ($kVA_{UL}$) is defined by the utility company. In the exemplary embodiment, central processing device 32 determines 130 if the present electrical load ($kVA_M$) on distribution transformer 62 is less than the maximum load rating ($kVA_{UL}$) of distribution transformer 62 minus a typical power drawn by EVCS 40 (e.g., 7.2 kW). Furthermore, if central processing device 32 determines 114 there is at least one EVCS in the charging queue, central processing device 32 also determines 130 if providing power to the at least one EVCS in the charging queue will cause the load on distribution transformer 62 to exceed the predefined maximum distribution transformer load rating ($kVA_{UL}$).

If central processing device 32 determines 130 that providing power to first EVCS 40 will cause the load on distribution transformer 62 to exceed the predefined maximum distribution transformer load rating ($kVA_{UL}$), method 102 includes denying 132 service to first EVCS 40 and placing first EVCS 40 in the charging queue. Alternatively, if first EVCS 40 was already in the charging queue, method 102 includes denying 132 service to first EVCS 40 and maintaining the position of first EVCS 40 in the charging queue. First EVCS 40 remains in the charging queue until the present electrical load ($kVA_M$) on distribution transformer 62 is at a level where providing power to first EVCS 40 will not cause the load on distribution transformer 62 to exceed the predefined maximum distribution transformer load rating ($kVA_{UL}$).

If central processing device 32 determines 130 that providing power to first EVCS 40 will not cause the load on distribution transformer 62 to exceed the predefined maximum distribution transformer load rating ($kVA_{UL}$), method 102 includes providing 134 a charging option to a consumer, for example, by providing a charging option selection signal to a display, for example, input/output device 86 (shown in FIG. 1). Input/output device 86 provides the charging option to the consumer. The charging option may give the consumer the choice of a charge-now selection and a charge-delay selection. EVCS 40, and more specifically, input/output device 86, may receive an input from the consumer corresponding to a selection of either the charge-now selection or the charge-delay selection. EVCS 40 generates a charge-now signal upon receipt of the charge-now selection, or generates a charge-delay signal upon receipt of the charge-delay selection, and transmits the charge-now signal or charge-delay signal to central processing device 32.

If the consumer selects the charge-now selection, charging of the electric vehicle begins at the time the charge-now signal is received by central processing device 32 and the consumer is charged a higher than time-of-use rate. If the consumer selects the charge-delay selection, charging of the electric vehicle begins after the present load on distribution transformer 62 decreases to a level where charging the electric vehicle at EVCS 40 would not cause the present load on distribution transformer 62 to exceed the nominal load rating. If the consumer selects the charge-delay selection, method 102 includes delaying 138 service to first EVCS 40 until the present load on distribution transformer 62 decreases. After the delay, central processing device 32 transmits 140 the electric power charging signal to first EVCS 40 and the consumer is charged a typical time-of-use rate. Alternatively, if the consumer selects the charge-now selection, method 102 includes providing 142 the electric power charging signal to first EVCS 40 upon receipt of the charge-now signal.

Figure 3:
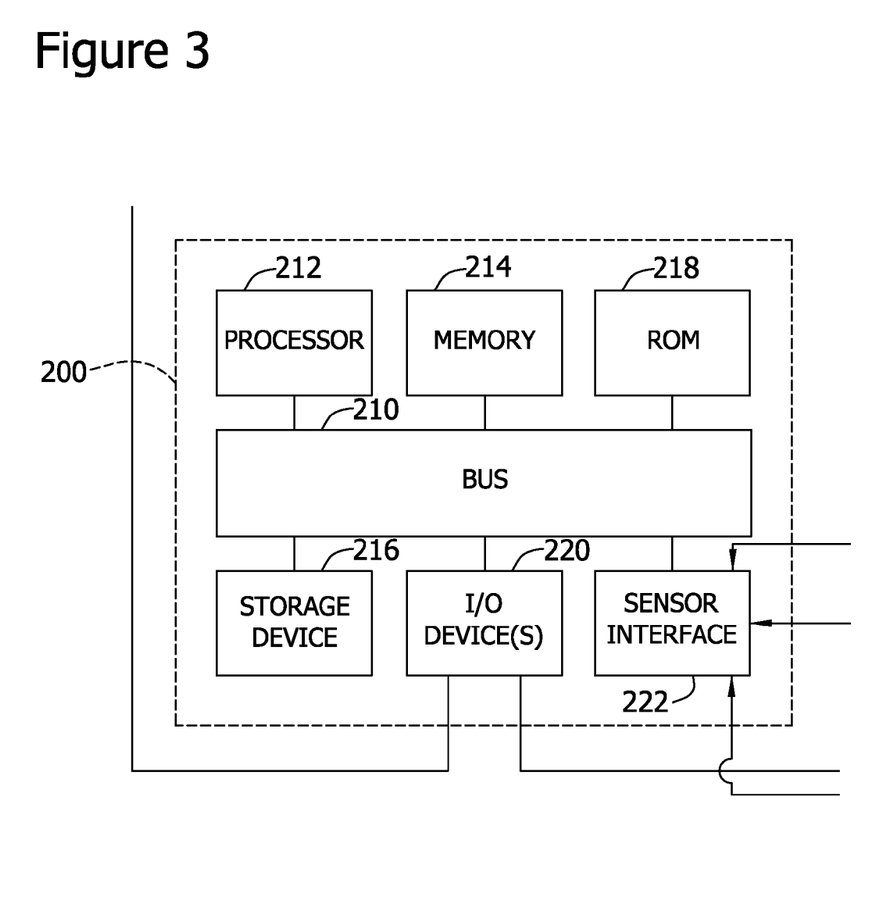
FIG. 3 is a block diagram of an exemplary embodiment of a processing device that may be included within the electric vehicle charging system shown in FIG. 1.

FIG. 3 is a block diagram of an exemplary embodiment of a processing device 200 that may be included within electric vehicle charging system 20 (shown in FIG. 1), and more specifically, within central processing device 32 (shown in FIG. 1). Central processing device 32 is configured to perform operations associated with method 102 (shown in FIG. 2). Processing device 200 may also be referred to as a system controller and/or a smart device data concentrator. In some embodiments, processing device 200 includes a bus 210 or other communications device to communicate information. One or more processor(s) 212 are coupled to bus 210 to process information, including data received from, for example, but not limited to, sensor 82 (shown in FIG. 1) and/or input/output device 86 (shown in FIG. 1). As used herein, the term processor broadly refers to a processor, a microcontroller, a microcomputer, a programmable logic controller (PLC), an application specific integrated circuit, and other programmable circuits, and these terms are used interchangeably herein. Furthermore, processor(s) 212 may be included within a computer. Aspects of the disclosure transform a general-purpose computer into a special-purpose computing device when configured to execute the instructions described herein.

Processing device 200 may also include one or more random access memories (RAM) 214 and/or other storage device(s) 216. RAM(s) 214 and storage device(s) 216 are coupled to bus 210 to store and transfer information and instructions to be executed by processor(s) 212. RAM(s) 214 (and/or storage device(s) 216, if included) can also be used to store temporary variables or other intermediate information during execution of instructions by processor(s) 212. Processing device 200 may also include one or more read only memories (ROM) 218 and/or other static storage devices coupled to bus 210 to store and provide static (i.e., non-changing) information and instructions to processor(s) 212. For example, static information may include, but is not limited to, a predefined maximum load rating and a predefined nominal load rating for a distribution transformer. Instructions that are executed include, without limitation, resident conversion and/or comparator algorithms. The execution of sequences of instructions is not limited to any specific combination of hardware circuitry and software instructions.

Processing device 200 may also include, or may be coupled to, input/output device(s) 220. Input/output device(s) 220 may include, or be coupled to, any device known in the art to provide input data to processing device 200 and/or to provide outputs, such as, but not limited to, an electric power charging signal. Instructions may be provided to RAM 214 from storage device 216 including, for example, a magnetic disk, a read-only memory (ROM) integrated circuit, CD-ROM, and/or DVD, via a remote connection that is either wired or wireless providing access to one or more electronically-accessible media. In some embodiments, hard-wired circuitry can be used in place of or in combination with software instructions. Thus, execution of sequences of instructions is not limited to any specific combination of hardware circuitry and software instructions, whether described and/or shown herein. Also, in the exemplary embodiment, input/output device(s) 220 may include, without limitation, computer peripherals associated with an operator interface (e.g., a human machine interface (HMI)) such as a mouse and a keyboard (neither shown in FIG. 3), and/or input/output device 86 (shown in FIG. 1). Furthermore, in the exemplary embodiment, additional output channels may include, for example, an operator interface monitor and/or alarm device (neither shown in FIG. 3). Processing device 200 may also include a sensor interface 222 that allows processing device 200 to communicate with sensors, for example, sensor 82 (shown in FIG. 1). Sensor interface 222 may include one or more analog-to-digital converter that converts analog signals into digital signals that can be used by processor(s) 212.

Figure 4:
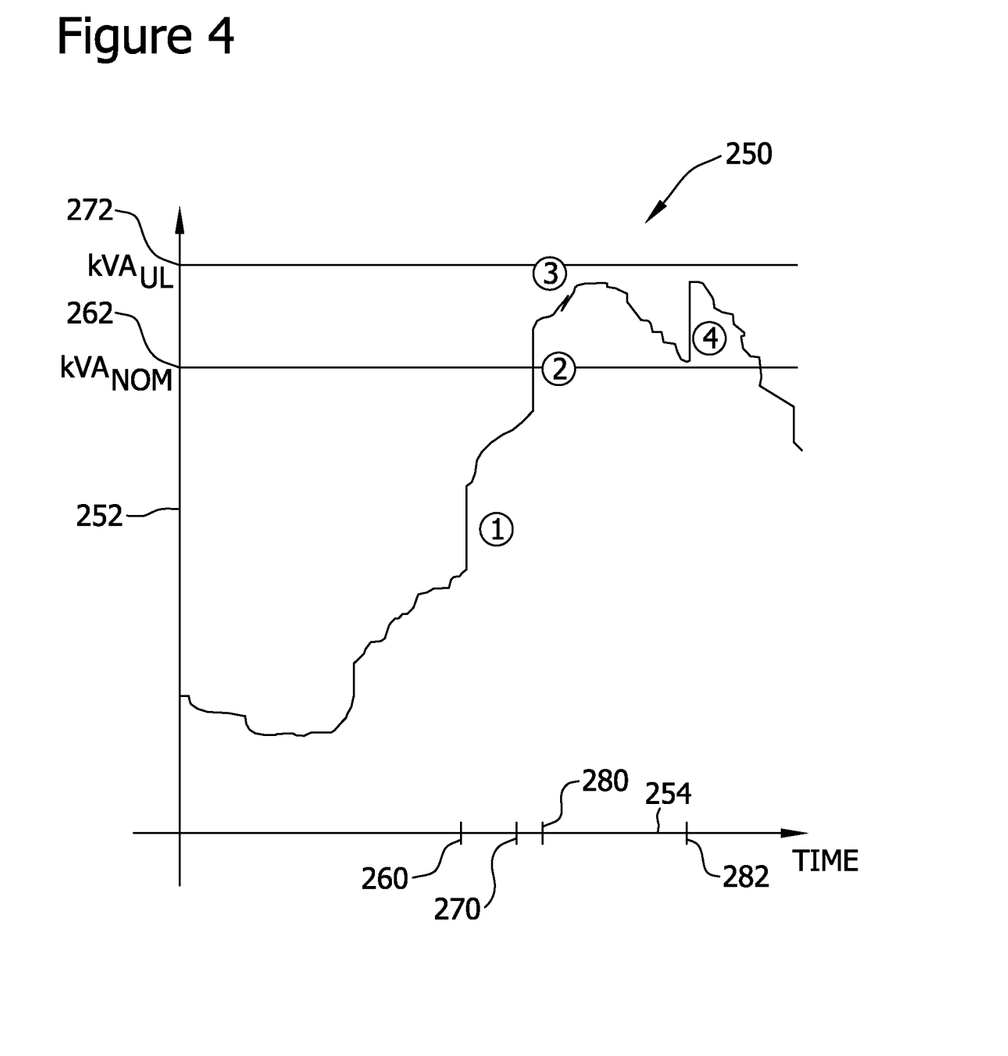
FIG. 4 is a graph of exemplary levels of loads on the distribution transformer shown in FIG. 1.

FIG. 4 is a graph 250 of exemplary load levels 252 on a distribution transformer, for example, distribution transformer 62 (shown in FIG. 1) over time 254. In the example shown in FIG. 4, at a first time 260, a first electric vehicle is coupled to electric vehicle charging system 20 (shown in FIG. 1), for example, at first EVCS 40 (shown in FIG. 1). Central processing device 32 determines that charging the first vehicle would not cause the load 252 on distribution transformer 62 to exceed a nominal load rating 262 for distribution transformer 62. Accordingly, an electric power charging signal is transmitted by central processing device 32 to first EVCS 40 and charging of the first vehicle begins. At a second time 270, first vehicle continues to draw power from distribution transformer 62, and a second vehicle is coupled to electric vehicle charging system 20, for example, at second EVCS 42 (shown in FIG. 1). Central processing device 32 determines that charging the second vehicle would cause the load 252 on distribution transformer 62 to exceed nominal load rating 262, but would not cause the load 252 on distribution transformer 62 to exceed a predefined maximum load rating 272 for distribution transformer 62. In the example shown in FIG. 4, the consumer would like to begin charging the second vehicle now, and is willing to pay a rate that is higher than a typical time-of-use rate, in order to begin charging the second vehicle now. Therefore, the consumer selects the charge-now option, and the electric charging signal is provided to second EVCS 42, the electric vehicle begins charging, and the load 252 on distribution transformer 62 increases.

At a third time 280, a third electric vehicle is coupled to electric vehicle charging system 20, for example, at third EVCS 44 (shown in FIG. 1). Central processing device 32 determines that charging the third vehicle would cause the load 252 on distribution transformer 62 to exceed nominal load rating 262, and would cause the load 252 on distribution transformer 62 to exceed the predefined maximum load rating 272 for distribution transformer 62. Central processing device 32 places third EVCS 44 in a charging queue to prevent load 252 from exceeding the predefined maximum load rating 272.

At a fourth time 282, the load 252 on distribution transformer 62 has decreased to a level where providing power to third EVCS 44 would not cause the load 252 on distribution transformer 62 to exceed the predefined maximum load rating 272. However, since the load 252 remains above nominal load rating 262, third EVCS 44 is not assigned to the first available slot at a typical time-of-use rate, rather, the consumer is provided with a charging option. In the example shown in FIG. 4, the consumer would like to begin charging the third vehicle now, and is willing to pay a rate that is higher than the typical time-of-use rate, in order to begin charging the third vehicle now. Therefore, the consumer selects the charge-now selection and the electric charging signal is provided to third EVCS 44, and load 252 increases during charging of the third electric vehicle.

Described herein are exemplary methods and systems for controlling an electric vehicle charging system that includes a plurality of electric vehicle charging apparatus. More specifically, the methods and systems described herein facilitate determining a charging order for a plurality of electric vehicles coupled to a distribution transformer based at least partially on a comparison of a present electrical load on the distribution transformer to at least one of power available under a predefined nominal power rating for the distribution transformer and a predefined maximum distribution transformer load rating. Controlling the charging of electric vehicles facilitates maintaining the load on the distribution transformer below an upper power limit, which maximizes a lifecycle of the distribution transformer. Furthermore, the methods and systems described herein provide a consumer with charging options that take into consideration a monetary electric rate charged by the utility company and the time that the vehicle is charged.

The methods and apparatus described herein facilitate efficient and economical distribution of power. Exemplary embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electric vehicle charging system comprising:
   a plurality of electric vehicle charging apparatus coupled to, and configured to receive electric power from, a distribution transformer;
   a central processing device configured to control operation of said plurality of electric vehicle charging apparatus; and at least one sensor coupled to said central processing device and configured to provide said central processing device with data, said central processing device further configured to:
determine a present electrical load on the distribution transformer based on the data;
receive a charging request from a first electric vehicle charging apparatus of said plurality of electric vehicle charging apparatus;
determine if providing power to said first electric vehicle charging apparatus will cause the present electrical load on the distribution transformer to exceed a predefined nominal load rating of the distribution transformer;
provide said first electric vehicle charging apparatus with an electric power charging signal if providing power to said first electric vehicle charging apparatus will not cause the present electrical load on the distribution transformer to exceed the predefined nominal load rating of the distribution transformer;
compare the present electrical load to a predefined maximum distribution transformer load rating if it is determined that providing power to said first electric vehicle charging apparatus will cause the present electrical load on the distribution transformer to exceed the predefined nominal load rating of the distribution transformer;
deny service to said first electric vehicle charging apparatus if it is determined that providing power to said first electric vehicle charging apparatus will cause the present load on the distribution transformer to exceed the predefined maximum distribution transformer load rating; and
place the first electric vehicle charging apparatus in a queue.

2. A system in accordance with claim 1, wherein each of said plurality of electric vehicle charging apparatus comprises a communications device configured to transmit a unique identification signal to said central processing device.

3. A system in accordance with claim 2, wherein said identification signal uniquely identifies each of said plurality of electric vehicle charging apparatus, said central processing device configured to determine a number of electric vehicle charging apparatus coupled to the distribution transformer based on received identification signals.

4. A system in accordance with claim 1, wherein said central processing device is further configured to compare the present electrical load to a power available under the predefined nominal load rating for the distribution transformer to determine if providing power to said first electric vehicle charging apparatus will cause the present electrical load on the distribution transformer to exceed the predefined nominal load rating of the distribution transformer.

5. An electric vehicle charging system comprising:
a plurality of electric vehicle charging apparatus coupled to, and configured to receive electric power from, a distribution transformer;
a central processing device configured to control operation of said plurality of electric vehicle charging apparatus; and
at least one sensor coupled to said central processing device and configured to provide said central processing device with data, said central processing device further configured to:
determine a present electrical load on the distribution transformer based on the data;
receive a charging request from a first electric vehicle charging apparatus of said plurality of electric vehicle charging apparatus, said first electric vehicle charging apparatus comprises an input/output device configured to display at least one charging option to a consumer and to receive at least one charging selection from the consumer;
determine if providing power to said first electric vehicle charging apparatus will cause the present electrical load on the distribution transformer to exceed a predefined nominal load rating of the distribution transformer;
provide said first electric vehicle charging apparatus with an electric power charging signal if providing power to said first electric vehicle charging apparatus will not cause the present electrical load on the distribution transformer to exceed the predefined nominal load rating of the distribution transformer;
compare the present electrical load to a predefined maximum distribution transformer load rating if it is determined that providing power to said first electric vehicle charging apparatus will cause the present electrical load on the distribution transformer to exceed the predefined nominal load rating of the distribution transformer;
transmit a charging option signal to said first electric vehicle charging apparatus if it is determined that providing power to said first electric vehicle charging apparatus will not cause the present load on the distribution transformer to exceed the predefined maximum distribution transformer load rating, wherein upon receipt of the charging option signal, said input/output device displays the at least one charging option to the consumer; and
receive, from said input/output device, at least one of a charge-delay signal corresponding to a charge-delay selection and a charge-now signal corresponding to a charge-now selection.

6. A system in accordance with claim 5, wherein said central processing device is further configured to determine an energy rate associated with the charge-now selection and to include the energy rate within the charging option signal provided to said input/output device.

7. A system in accordance with claim 6, wherein the energy rate associated with the charge-now selection is greater than an energy rate associated with the charge-delay selection, wherein the energy rate associated with the charge-now selection is calculated to offset a loss in the value of the distribution transformer caused by the present load on the distribution transformer exceeding the predefined nominal load rating of the distribution transformer.

8. A method for controlling charging of an electric vehicle using an electric vehicle charging apparatus coupled to a distribution transformer, said method comprising:
determining an electrical load on the distribution transformer;
providing the electric vehicle charging apparatus with an electric power charging signal if providing power to the electric vehicle charging apparatus will not cause the electrical load on the distribution transformer to exceed a predefined nominal load rating of the distribution transformer;
determining if providing power to the electric vehicle charging apparatus will cause the load on the distribution transformer to exceed the predefined nominal load rating of the distribution transformer;
comparing the electrical load on the distribution transformer to a predefined maximum distribution transformer load rating if it is determined that providing power to the electric vehicle charging apparatus will cause the load on the distribution transformer to exceed the predefined nominal load rating of the distribution transformer; and denying service to the electric vehicle charging apparatus if it is determined that providing power to the electric vehicle charging apparatus will cause the load on the distribution transformer to exceed the predefined maximum distribution transformer load rating and placing the electric vehicle charging apparatus in a queue.

9. A method in accordance with claim 8, further comprising collecting input data and registering each electric vehicle charging apparatus coupled to the distribution transformer.

10. A method in accordance with claim 8, wherein determining if providing power to the electric vehicle charging apparatus will cause the load on the distribution transformer to exceed the predefined nominal load rating comprises comparing the electrical load on the distribution transformer to a power available under the predefined nominal power rating for the distribution transformer.

11. A method in accordance with claim 8, further comprising at least one of:

delaying service to the electric vehicle charging apparatus if it is determined that providing power to the electric vehicle charging apparatus will not cause the load on the distribution transformer to exceed the predefined maximum distribution transformer load rating and a charge-delay signal is received from the electric vehicle charging apparatus; and providing the electric power charging signal if it is determined that providing power to the electric vehicle charging apparatus will not cause the load on the distribution transformer to exceed the predefined maximum distribution transformer load rating and a charge-now signal is received from the electric vehicle charging apparatus.

12. A method in accordance with claim 8, further comprising determining a charging order for the plurality of electric vehicles based at least partially on a comparison of the electrical load on the distribution transformer to at least one of the power available under the predefined nominal power rating for the distribution transformer and the predefined maximum distribution transformer load rating.

* * * * *